United States Patent [19]

Struger

[11] Patent Number: 5,896,289

[45] Date of Patent: *Apr. 20, 1999

[54] OUTPUT WEIGHTED PARTITIONING METHOD FOR A CONTROL PROGRAM IN A HIGHLY DISTRIBUTED CONTROL SYSTEM

[75] Inventor: Odo J. Struger, Chagrin Falls, Ohio

[73] Assignee: Allen-Bradley Company, LLC, Milwaukee, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/711,378

[22] Filed: Sep. 5, 1996

[51] Int. Cl.$^6$ .......................... G05B 15/02; G05B 19/18
[52] U.S. Cl. .......................... 364/138; 364/131; 364/188; 364/191; 364/192; 395/155; 395/159; 395/161
[58] Field of Search .......................... 364/138, 146, 364/147, 185, 188–192, 131–136, 159, 578, 488, 491; 395/82, 84, 158, 155, 159, 161, 500; 455/445, 456, 457, 8, 9

[56] References Cited

U.S. PATENT DOCUMENTS

| | | | |
|---|---|---|---|
| 4,162,536 | 7/1979 | Morley | 364/900 |
| 4,172,289 | 10/1979 | Struger et al. | 364/900 |
| 4,742,443 | 5/1988 | Rohn et al. | 364/136 |
| 4,858,101 | 8/1989 | Stewart et al. | 364/131 |
| 4,972,365 | 11/1990 | Dodds et al. | 364/900 |
| 5,005,152 | 4/1991 | Knutsen | 364/900 |
| 5,157,701 | 10/1992 | Parker | 377/39 |
| 5,212,631 | 5/1993 | Schmidt et al. | 364/136 |
| 5,243,232 | 9/1993 | Bolda et al. | 307/296.4 |
| 5,245,331 | 9/1993 | Gibgons | 340/825.52 |
| 5,265,005 | 11/1993 | Schmidt et al. | 364/147 |
| 5,452,201 | 9/1995 | Pieronek et al. | 364/188 |
| 5,530,643 | 6/1996 | Hodorowski | 364/191 |

*Primary Examiner*—Reba I. Elmore
*Assistant Examiner*—Ramesh Patel
*Attorney, Agent, or Firm*—Keith M. Baxter; John J. Horn; John M. Miller

[57] ABSTRACT

A method of partitioning a control program among many spatially separated computing devices places most of the program instructions in computing devices supporting outputs to the controlled processor equipment. Inputs then simply report their data to the output computing devices rather than having that data processed by a path of computing devices communicating with each other such as may cause the evaluation of the outputs to be delayed by multiple transmissions on the common link.

10 Claims, 7 Drawing Sheets

| PROGRAM ELEMENT | OTHER ELEMENTS IN CONTROL MODULE | MOD CAT# | COST | INSTAL. |
|---|---|---|---|---|
| PB | — | — | 1 | 1 |
| PB | LT | — | 2 | 1 |
| PB | PB | — | 2 | 1 |
| PB | PB, LT, LT | — | 2.5 | 1 |
| PRS | — | — | 3 | 1 |
| SOL | X, X, X | — | 2 | 5 |

FIG. 10

| INSTRUCTION NAME | EMULATING CODE | ICON | TERM. | CLASS | DEM. | EQUIV. CAT.# | EXTERN. CON. |
|---|---|---|---|---|---|---|---|
| PB 102 | ADDR. 1 | XX | 1.1 | A | 10 | XXX | INPUT |
| LT 105 | ADDR. 2 | XX | 1.1 | A | 10 | XXX | OUTPUT |
| PRS 109 | ADDR. 4 | XX | 1.1 | C | 10 | XXX | INPUT |

FIG. 11

| PHYSICAL DEVICE ADDRESS | CLASS | DEVICE CAT.# | CAPAC. |
|---|---|---|---|
| 7 | A | XXX | 100 |
| 17 | B | XXX | 150 |
| 29 | A | XXX | 200 |

OUTPUT WEIGHTED PARTITIONING METHOD FOR A CONTROL PROGRAM IN A HIGHLY DISTRIBUTED CONTROL SYSTEM

FIELD OF THE INVENTION

This invention relates to industrial control systems, including programmable controllers, and more particularly, to a highly distributed industrial control system in which the control program is broken up and executed in many separate controllers and a method for programming the same.

BACKGROUND OF THE INVENTION

Industrial controllers such as those described in U.S. Pat. Nos. 3,810,118; 3,942,158; 4,165,534; and 4,442,504 are typically centralized, high-speed computers that may be connected to industrial equipment, such as automated assembly lines or machine tools, to operate such equipment in accordance with a stored control program. The stored program includes instructions, which when executed, examine the condition of selected inputs to the controller from sensing devices on the controlled equipment and outputs from the controller, and energize or de-energize selected outputs or actuators from the controller to operate devices on the controlled equipment.

Inputs to the industrial controller may be discrete binary signals, such as those from switches, which may detect limits of process variables such as motion, temperature, time, or other quantities, or the inputs may be analog measures of process variables which are generally then converted to digital words for processing, or the inputs may be multivariable information.

Similarly, the outputs of the industrial controller may be either discrete binary signals as produced, typically, by mechanical or solid state relays; analog outputs produced by means of a digital to analog converter; or multi-variable commands.

Some of the inputs and outputs to the industrial controller may be remotely located and communicated to the controller by means of a digital communications link. Typically, the digital communications link connects the controller with a remote "I/O rack" at which a number of inputs and outputs are clustered.

Present industrial controllers are often programmed by means of a "ladder logic" language in which the control program is represented as ladders whose vertical rails represent a power source or power return and whose rungs are series and parallel connected contacts and relay coils. The contacts may be either normally-open or normally-closed as controlled either by external inputs or by relay coils. This language reflects an implementation of the control program in discrete electrical devices (relays) as was practiced prior to industrial controllers.

The centralized architecture of current industrial control systems, in which a single central controller is used to read and control many remote control points, reflects both the historically high cost of computer hardware (as may be reduced by the use of a single centralized controller) and the desire for centralized reporting and coordination of the operation of an entire industrial process. Nevertheless, a centralized controller architecture may not be ideal for all control tasks.

For some simple control tasks with few inputs and outputs, the centralized controller may be unnecessarily complex and expensive, providing unneeded features and capacity. Conversely, for some complex control tasks with many inputs and outputs, the speed limitations of the centralized controller may significantly degrade the performance of the control system.

The centralized controller typically processes each input and output of the control system, sequentially. For large programs, a significant delay may occur between the changing of an input and the control of a corresponding output. If the delay is large enough, the control system may become sluggish or unpredictable. With a centralized controller, the state of each remote input and output must also be repeatedly transmitted over the link to the centralized controller. When there are many remote inputs and outputs to the control system, the capacity of the link between the I/O and the centralized controller may become overloaded.

Finally, failure of the centralized controller typically disables the entire control system. Troubleshooting the cause of the controller failure may be difficult because often the failed controller cannot report information about its internal operation or execute troubleshooting programs.

One technique for eliminating some of these shortcomings of a centralized controller architecture is to divide the control process up to be executed by many separate computing devices each of which may be located near each of the different control points on the machine or process. In this way, input and output signals are only communicated to a local computing device and do not tax the capacity of the link connecting the computing devices together. Because the many computing devices may perform their control tasks in parallel, an effective speed gain is also realized. This approach, where there are many separate computing devices acting in concert, is termed: "highly distributed control".

Ideally, in a highly distributed control system, a single control program is written for the entire system and then broken apart so that portions can be transmitted (downloaded) to and stored in each of the computing devices. Together with the control program, the computing devices receive instructions as to how to communicate among each other to synchronize the control process.

Dividing a single control program among various distributed computing devices, and providing the computing devices with the necessary instructions to synchronize their operation can be a difficult and time consuming process. Normally, there will be a number of ways that a control program can be divided. Choosing the correct division is important to ensure optimal performance of the control system.

SUMMARY OF THE INVENTION

The present invention provides a partitioning program, typically operating on the same computer used to develop the control program, for dividing the control program among many computing devices on an automatic or semiautomatic basis.

Generally, the program works by identifying those program instructions of the control program that are associated with outputs to the controlled equipment. Each "output program instruction" is copied to the program memory of the computing devices providing the output to the controlled equipment ("output computing devices"). Next the remaining elements of the control program on which the output program instruction is dependent, are also copied into the output computing device. Generally, the computing devices providing inputs are linked to the program instructions collected in the output computing device so that information from the inputs may be transmitted over the common link directly to the output computing device. Typically, duplicate portions of the control program will be simultaneously executed in parallel in a number of computing devices.

Under this partitioning method, delays caused by "data latency" are eliminated. As used herein, data latency refers to delays in the transmission of data through the distributed control system caused by the data stopping at an intermediary computing device while awaiting a condition dependent on data not yet received. For example, a program instruction of a control program which emulates a contact pair wired in series with an earlier contact pair, cannot determine or transmit its output (that is whether it is closed or open) until it receives an input from the earlier contact pair indicating that the latter contact pair has received power. The data of whether the contacts are open or closed is latent until the earlier contact closes. The problem of data latency and the advantage of the present invention will be described in more detail in the Overview Of The Invention section below and in the Detailed Description of the Preferred Embodiment.

Specifically then, the present invention provides a partitioning program for dividing a control program used to control industrial equipment into portions to be executed by spatially separated computing devices. The computing devices have program memories and communicate with other computing devices via messages on a communications link and are attached to parts of the industrial equipment directly, not through the communications link, to provide output signals and to receive input signals. The control program, when executed, accepts the input signals from the industrial equipment and determine the output signals to the industrial equipment. The control program is composed of logically interconnected program instructions including output instructions representing output signals to the industrial equipment.

In this environment, the partitioning program executing on an electronic computer includes an allocation routine reviewing the control program to identify output instructions and copying a given output instruction from the control program to the program memory of a particular computing device that is directly attached to the part of the industrial equipment receiving the output signal of the given output instruction. The partitioning program also includes a collection routine copying into the program memory of the particular computing device other program instructions on which the output signal represented by the given output instruction depends.

Thus, it is one object of the invention to concentrate the instructions of a control program in computing devices having outputs. Having all inputs transmitted directly to the outputs which depend on them eliminates data latency delays caused by currently available input data that is being held by an intermediary processing node.

The computing devices receiving input signals on which the other program elements depend may simply broadcast those input signals on the communications link to the output computing devices and other computing devices.

Thus it is another object of the invention to provide a highly distributed control system in which computing devices not having output instructions may be preprogrammed or simply programmed to relay input signals without further programming related to a particular application.

It is another object of the invention to simplify programming of an industrial controller by eliminating the need to program specific connections between modules on the link.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 10 is a chart of a database of supplemental information about the elements of the control program of FIG. 4 used in the present invention; and FIG. 11 is a chart of a database of information about the computing devices that may be interconnected as shown in FIG. 6 as used in the present invention.

DETAILED DESCRIPTION OF THE PREFERRED EMBODIMENT

OVERVIEW OF THE INVENTION

Figure 1:
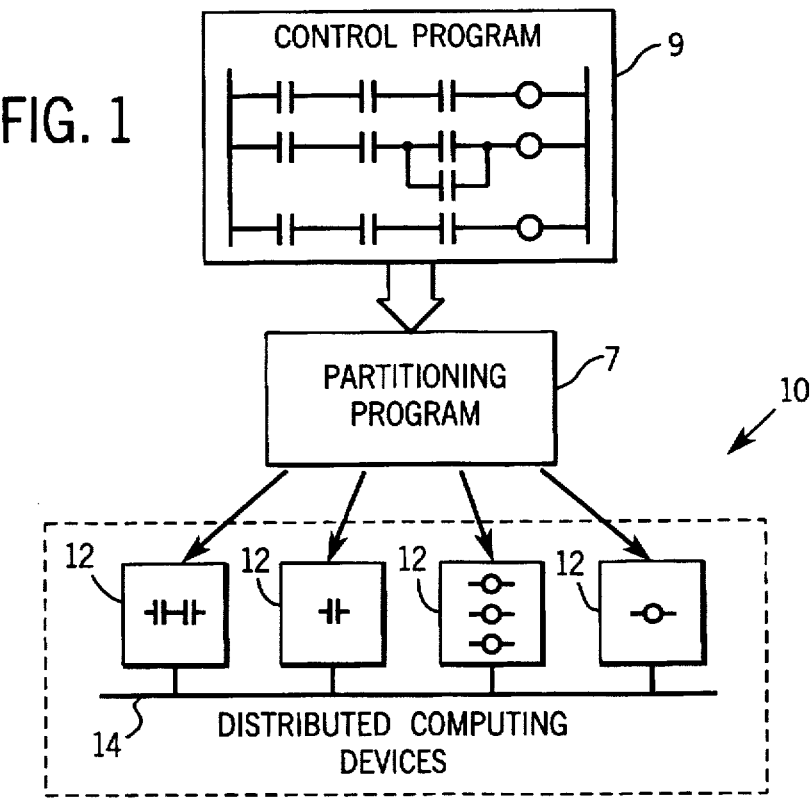
FIG. 1 is a block diagram showing the relationship of the partitioning program of the present invention to the control program and the highly distributed industrial controller.

Referring to FIG. 1, a control program 9 written to control, for example an industrial process, may be received by a partitioning program 7 and broken up so that particular instructions of the control program 9 are downloaded to different computing devices 12 each of which is connected on a common communication link 14. The computing devices 12 then cooperatively execute the various parts of the control program 9 to control the industrial process.

Normally there will be many possible different ways of making the partition. How well the industrial controller works will depend to a significant degree on how the control program 9 is partitioned among the computing devices 12 by the partitioning program 9.

Figure 2A:
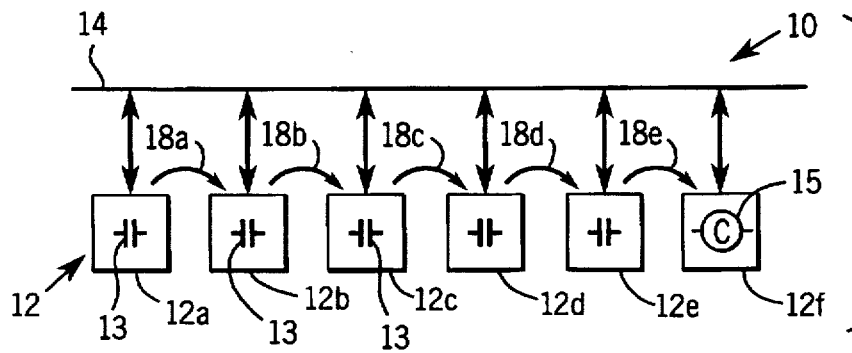
FIG. 2a is a schematic representation of message transmission in a simple control program partitioned among computing devices without output weighting.

Referring now to FIG. 2a, as mentioned, the highly distributed control system 10 may include a plurality of computing devices 12 each including a processor and memory (not shown) for executing a portion of a control program 9. The processors 12 are connected on a common communication link 14 which enables them to communicate with each other. Each computing device 12 may provide a physical connection (an input or output) to controlled machinery or equipment (not shown). In the example of FIG. 2a, computing devices 12a through 12e accept inputs in the form of contact closures of physical contacts (not shown) and output computing device 12f provides an output in the form of a physical relay coil (not shown).

The control program 9 in this example is made of program instructions represented by virtual contacts 13 and a virtual coil 15 which receive data from the physical contacts and provide data to the physical coil mentioned above. Five normally open virtual contacts 13 are connected in series to energize the virtual coil 15 when all of the contacts are closed. The virtual coil 15 is an "output program instruction" insofar as it determines the state of an output signal that is directly wired to a portion of the industrial controller without further communication on the link 14.

In a nonoutput weighted partitioning, shown in FIG. 2a, the program instruction represented by each virtual contact 13 is placed in the program memory of a different computing device 12a through 12e. The computing devices 12 are then further programmed to communicate with each other to effectively link the contact instructions together in series.

More specifically, the program of 12a assumes that one side of its contact 13 is connected to a line voltage (not shown). When the physical contact associated with virtual contact 13 of computing device 12a closes, the computing device 12a sends a message (indicated by arrow 18a) to computing device 12b. The message indicates that a virtual voltage on the upstream side of the virtual contact of computing device 12b is now high. Computing device 12b receives the message 18a and if the contact associated with computing device 12b is closed, computing device 12b in turn sends a similar message 18b to computing device 12c. This process is repeated for each of computing devices 12a through 12e and if they are all closed, computing device 12e sends a message 18e to output computing device 12f which activates the coil associated with output computing device 12f.

Each of the computing devices 12a through 12f transmit the state of their output (the virtual voltage) of their virtual contact 13 on the link 14 only upon a change of state of that output. Otherwise the computing devices 12a through 12f provide no output to the common link 14.

While the above described partitioning of the control program 9 among the computing devices 12 has a certain logical appeal, it can create a large delay in the activation of the coil associated with output computing device 12f and considerable variation in the response speed of the distributed system 10 depending on the order of contact closures of the contacts associated with the computing devices 12a through 12e. For example, if the contact associated with computing device 12e is the last contact to close, then there is a single message 18e that needs to be transmitted before activation of the coil associated with output computing device 12f. Processing delays within the computing modules 12 have been ignored under the assumption that similar processing delays will occur regardless of the partitioning of the control program 9.

On the other hand, if the contact associated with computing device 12a is the last contact to close, there will need to be five sequential messages transmitted before the coil of output computing device 12f is activated. In this latter situation, the data of the contacts of computing devices 12b through 12e are held hidden within the computing devices 12b through 12e until the closure of the contact of 12a and only then this hidden data may be transmitted to other components of the distributed control system 10 where it may be needed. Delays caused by this hidden data is what has been referred to above as "data latency" delay and reflects delay between a set of input conditions being satisfied, and an output dependent on those inputs changing state. In a control system where high speed real time control is necessary, data latency delay is undesirable.

Figure 2B:
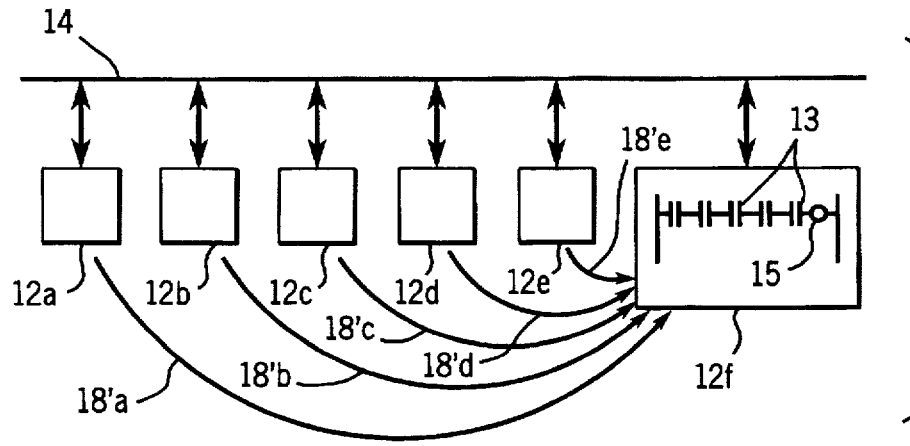
FIG. 2b is a figure similar to that of FIG. 2a showing an output weighted partitioning.

Referring now to FIG. 2b in the present invention the same computing devices 12a through 12f are employed, however the partitioning of the control program 9 is concentrated in the output computing device 12f which provides an output to a physical coil. In this case none of computing devices 12a through 12e hold any of the control program 9 but instead transmit the state of their contacts directly to the output computing device 12f when the state of the physical contact associated with the computing devices 12a through 12e changes. The computing device 12f holds the entire program.

Now the data latency is eliminated because, for example, the state of the physical contacts associated with computing device 12b do not require closure of the physical contacts associated with computing device 12a to be transmitted to the output computing device 12f. In this case, regardless of whether the physical contacts of computing device 12a or the physical contacts of computing device 12e (or any other computing device 12) are last, only a single message transmission delay separates the last contact closure from activation of the output coil of 12f.

In this simple example, each contact of computing devices 12a through 12e provides information to only one output computing device 12f. Typically there will be multiple output computing devices 12f requiring data from a given input computing device 12a through 12e. In this case, the partitioning program will load into each of the output computing devices, the program instruction on which the output depends. As a consequence, several output computing devices may contain the same portions of a control program 9 to execute those portions simultaneously in parallel. Because each input computing device 12a through 12e may broadcast its change of state to a number of output computing devices, this duplicate execution of program instructions does not adversely affect the performance of the system.

It will be recognized that other forms of communication between the computing devices 12a through 12e and 12f may be used including a system in which the computing device 12f polls the computing devices 12a through 12e with individual messages.

AN EXAMPLE PROCESS

Figure 3:
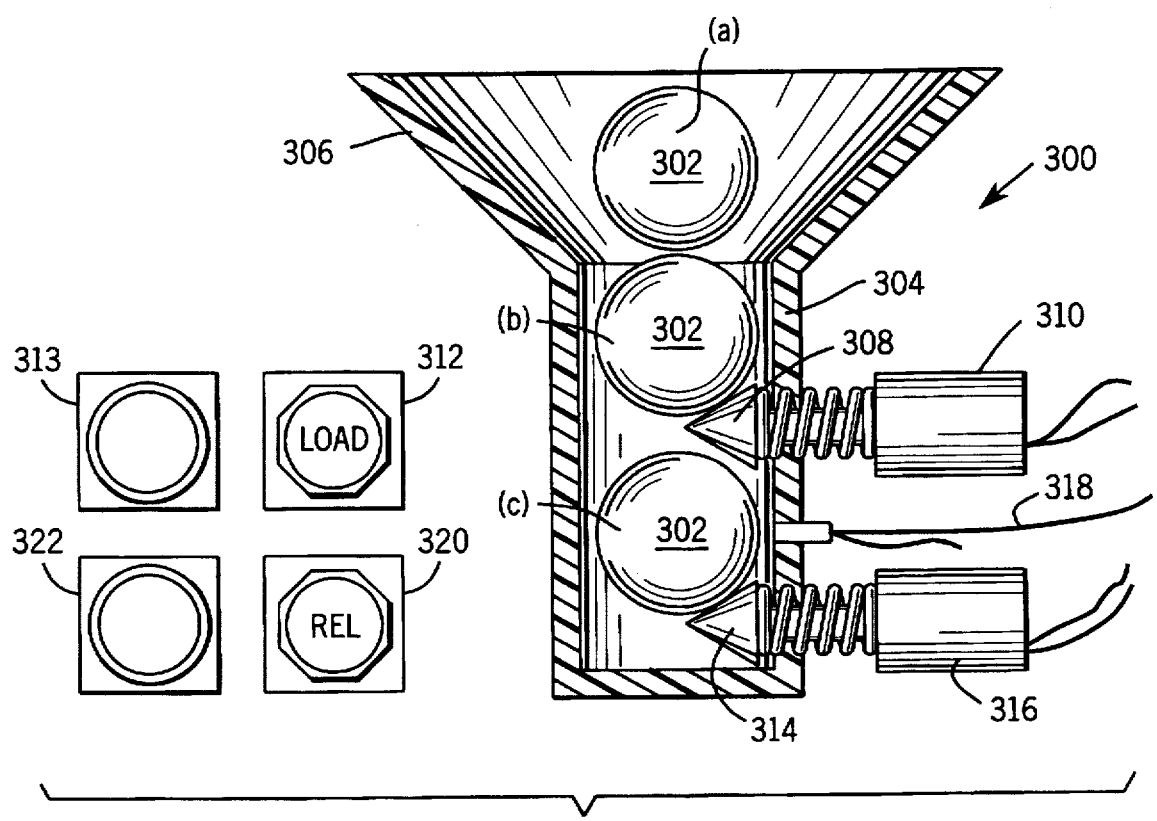
FIG. 3 is an elevational view of elements of a process to be controlled to stage and release balls such as may employ a highly distributed control system.

Referring now to FIG. 3, a simple process 300 suitable for use with a highly distributed control system may control the release of balls 302 through a tube 304. In the process 300, a large supply of balls 302 is held within a hopper 306 which funnels them into the upper opening of tube 304. The funneling permits the entry of a single ball 302 from position (a). The ball 302 is then stopped in the tube 304 at position (b) by a pawl 308 attached to a solenoid 310.

Solenoid 310 may be activated by pressing load pushbutton 312 whereupon it retracts pawl 308 permitting ball 302 to drop to position (c) where it is stopped by pawl 314 attached to solenoid 316. At position (c), ball 302 is sensed by proximity switch 318.

Upon a pressing of release pushbutton 320, solenoid 316 is activated by retracting pawl 314 and allowing ball 302 to drop out of tube 304. At the time of activation of the load pushbutton 312, a lamp 313 may light and similarly at the activation of pushbutton 320, lamp 322 may light. After a predetermined number of balls 302 has dropped from tube 304, the solenoid 310 is deactivated so no further balls are loaded.

Figure 4:
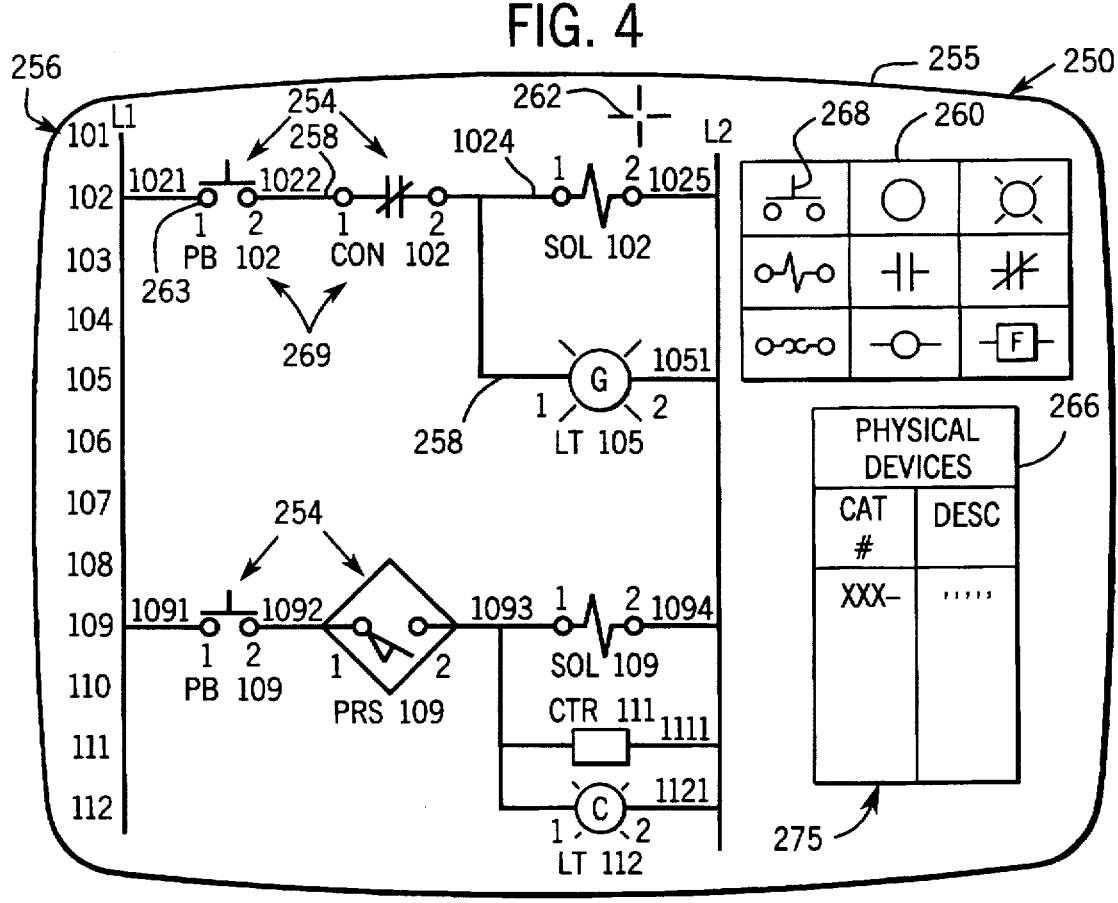
FIG. 4 is a computer display of a control program represented in modified relay ladder language suitable for use with the process of FIG. 3.

Referring now to FIGS. 3 and 4, a programmer preparing a highly distributed control system for the process 300 first prepares a control program 250. The control program 250 is represented graphically on a computer display 255 according to conventional relay ladder language conventions and may be produced on a commercial CAD package such as AutoCAD, a well known commercial CAD package produced by AutoDesk, Inc. of Sausalito, Calif. Such CAD packages operate on standard PC type computers and are intended for the production of engineering drawings for the design of various products and produce data files representing the graphical structure of the drawing produced on the computer's electronic display. A data file produced by such CAD programs and providing a machine readable representation of the control program 250 will be described below.

According to standard electrical practice, the control program 250 includes line numbers 256 displayed on the left side, in this case forming a vertical margin of numbers 101 through 112. A left vertically running line is positioned just inside the numbers 256. A right vertically running line provides a right margin to the control program 250. These lines, designated L1 and L2, represent electrical power rails which provide a virtual source and sink of current carried on "virtual wires" 258 (shown as lines on the display screen 255).

The physical elements of the process 300 of FIG. 3 are represented in schematic form by program instructions 254 depicted as JIC type icons connected between the lines L1 and L2 just as if they were computing devices electrically connected to power. Thus, a program instruction 254 labeled PB102 (representing pushbutton 312 of FIG. 3) has a first terminal "1" connected to the first power rail L1. The second terminal "2" of PB102 is in turn connected to a first terminal "1" of program instruction of a normally closed contact CON 102 that is controlled by the counter CTR111 to be described. Contact CON 102 serves to disable the rest of the circuit after a certain number of balls 302 have dropped.

Note that the numbers associated with each instructions, e.g. PB102 are not operands of those instructions but simply unique designators of the instructions that will be used to identify the instructions later. The numbers are derived from the marginal line numbers associated with the wires to the depicted devices.

The remaining terminal of the contract CON 102 connects both to program instruction SOL102 (representing solenoid 310 in FIG. 3) and LT105 (representing lamp 313 in FIG. 3) both wired in parallel and having their second terminals connected to the second power rail L2 extending vertically down the right of the schematic forming the control program 250.

Program instruction PB109 (representing pushbutton 320 in FIG. 3) also connects at one terminal to the power rail L1. Its second terminal connects to a first terminal of PRS109 (corresponding to proximity switch 318 in FIG. 3). The output of PRS109, the latter which is normally open, is connected to one terminal each of SOL109 (representing solenoid 316 in FIG. 3). CTR111 being the counter referred to above and LT112 (representing lamp 322 in FIG. 3). The counter CTR111 counts each activation of the solenoid SOL109 and after a predetermined number is reached opens contacts CON 102.

The programmer constructs the logical diagram of the control program 250 by selecting program instructions 254 from a menu 260 and "wiring" their terminals together using standard CAD techniques. The program instructions 254 may be selected from a program instruction menu 260 to the right of the display screen 255 which includes pictures of standard electrical schematic symbols well known in the art. The particular program instructions 254 may be selected by the operator by movement of a cursor 262 on the display screen 255 by means of a cursor control device such as a mouse or trackball. The cursor 262 is positioned over the appropriate symbol of the program instruction menu 260 which is then "dragged" to an appropriate position on the screen. A drawing tool may then be invoked to connect the various discrete program instructions 254 together at their terminals 263 represented by small circles.

Each program instruction 254 is provided with an unique program instruction name 269 displayed beneath the program instruction 254 for the elemental function represented by that program instruction 254. For example, the unique program instruction name 269 for the program instruction PB102 referred to above is simply "PB102". The unique program instruction name 269 is used by the CAD program to associate various qualities of the elemental function to the program instruction 254, and is generated automatically by the CAD system.

As depicted, the unique program instruction name 269 follows standard schematic practice where the first alphanumeric portion of the caption is an abbreviation of the device type. Hence, pushbuttons employ the letters PB, proximity switches employ the letters PRS, solenoids the letters SOL, and lights the letters LT. The numeric portion of the caption following the alphanumeric portion is the line number of the device on the schematic taken from the line numbers 256. Terminals 263 of the discrete program instruction 254 are also numbered and a page number for the particular page of the control program 250 may be added for schematics that extend over multiple pages.

This unique program instruction name 269 is then linked to a catalog type by an internal file (not shown) to provide additional information for each elemental function represented by a program instruction 254. The power rails L1 and L2 are also represented as icons (vertical straight lines), however, they are automatically positioned on the display screen without operator intervention, and do not need further identification.

Wires 258 are also labeled with numbers related to their line numbers and their order in a line from left to right. Hence the first wire 258 at line 102 attached to L1 is numbered 1021, the next wire 258 in that line is numbered 1022 and so forth.

As each program instruction 254 is selected from the program instruction menu 260, a computing device menu 266 also appears to the right of the display screen 255 listing computing devices of that general class and providing specific catalog numbers for commercial products that are within the general class of the icon selected. In this case, the commercial products represent discrete components that work with real wire rather than the virtual components that may be implemented in the highly distributed control system of the present invention. For example, if a pushbutton switch icon 268 is selected, the computing device menu 266 will provide catalog numbers for various types of mechanical pushbutton switches having physical screw terminals. These pushbuttons may be normally open, normally closed and may have one or more sets of gang contacts depending on the choice of the designer.

Thus, each program instruction 254 has associated with it, a catalog number for a specific device that uniquely identifies how the device operates. This information will be used for programming the computing devices that emulates these devices. For many catalog numbers, the same program instruction 254 will be displayed upon the display screen 255.

Referring to FIG. 10, additional information about each program instruction 254 is linked to the unique program instruction name 269 for that program instruction 254. This additional information is provided by a second data list 267 (not visible to the programmer) cross referencing equivalent device catalog numbers 277 and unique program instruction name 269 of the program instructions to other data about the represented program instruction.

In this data list 267, a pair of columns 271 provides information about the icon used to represent the elemental function including the number of input and output terminals that may accept wires. A column 270 provides a pointer identifying a program subroutine that may be used to emulate the elemental function represented by the unique program instruction name 269. For example, the operation of a pushbutton switch in normally open or normally closed states will have one of two implementing programs that may be loaded into a computing device to emulate the pushbutton.

Data list 267 also indicates a class 273 of the elemental function broadly characterizing those elemental functions that require special hardware like pushbutton operators or lamps. All pushbutton switches requiring a physical pushbutton operator will be of a single class, in this case class A. The proximity switch PRS109 is of class C indicating that separate specialized hardware is required.

Closely analogous to the class 273 is a demand characteristic 274 which indicates an estimate of the burden the program instruction 254 will place on the implementing processor of the emulating computing device and in the preferred embodiment is a composite figure reflecting the speed of the processor and the amount of electronic memory in the computing device. In this case, pushbutton switches which have relatively simple logic and require little processor speed or memory and thus have a low demand of ten whereas the filter which requires additional processor time and memory shows a demand of 110. Demand generally indicates how demanding the emulation is of hardware.

A final column of data 276 indicates whether the program instruction provides output to the controlled process or machine. Generally, such program instructions are classified as "output program instructions", a classification that will be employed in partitioning the control program 9 among the computing devices. Conversely, a program instruction that receives input from the controlled process or machine is classified as an "input program instruction". A control program 9 instruction 254 that has no external connection either input or output is classified as "spatially independent". Pushbutton PB102 is an input program instruction; CTR111 is a spatially independent program instruction and SOL102 and SOL109 and LT 105 and LT112 are output program instructions. These classifications are determined by the instruction type and preprogrammed into column 276 of data list 267.

Figure 9:
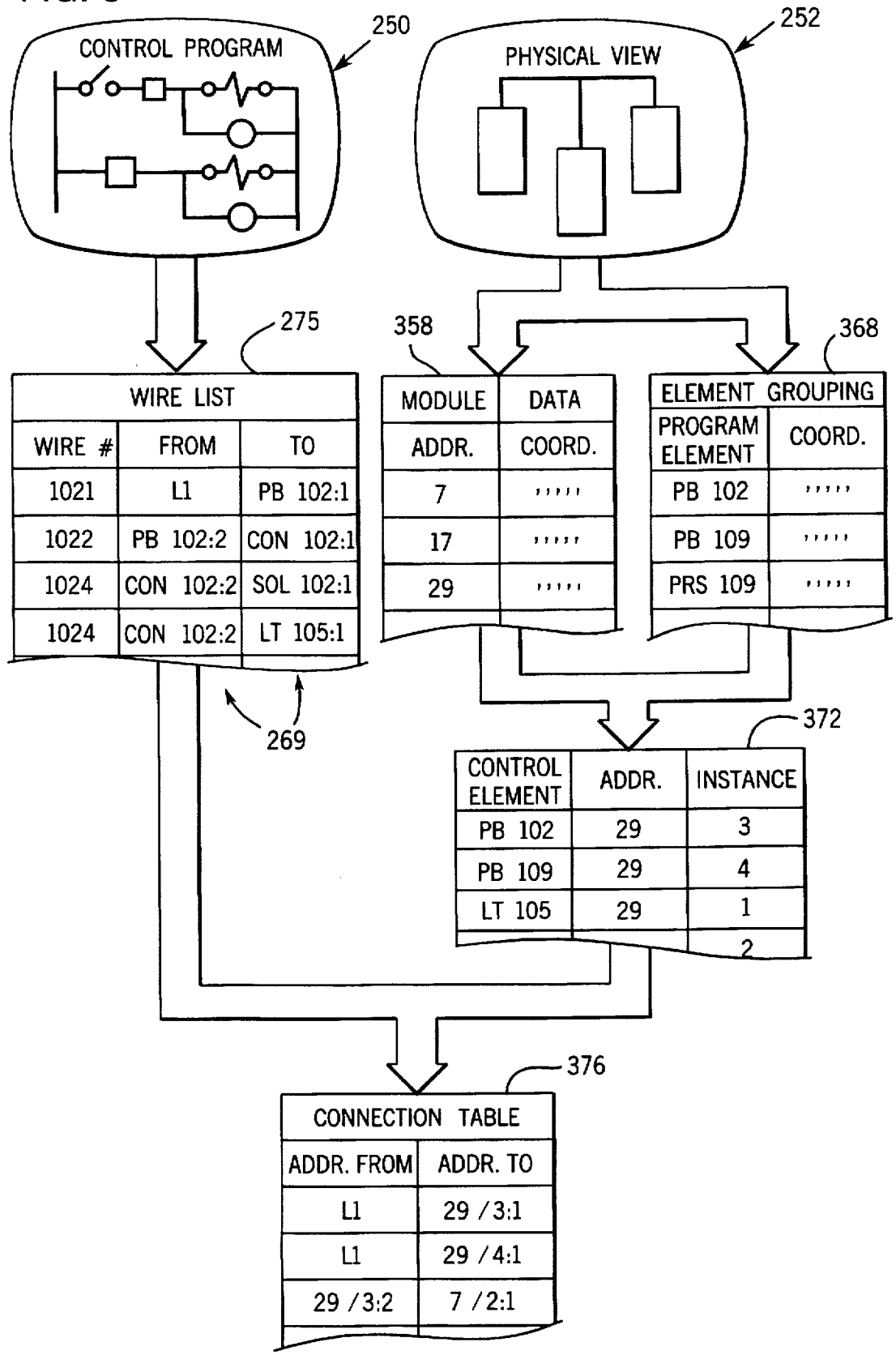
FIG. 9 is a flow chart showing the compiling of the control program of FIG. 4 and the grouped physical view of FIG. 6 into data tables which may be loaded into the computing devices for a distributed execution of the control program.

Referring now to FIGS. 4 and 9, the CAD program saves the data of the control program 250 not as a bit map of the image of the schematic of the control program 250 as it appears on the display screen 255, but rather in the form of a wire list 275 relating wire numbers to source and destination program instructions 254 described by their unique program instruction name 269 and terminal numbers as described above. The wire list 275 provides three columns of data: a unique wire number and unique program instruction names 269 for two interconnected program instructions 254. The unique program instruction names 269 are augmented in this case by a terminal number separated from the unique program instruction names 269 by a colon. Hence PB102:1 is the first terminal of the program instruction 254 associated with program instruction PB102. In other words, each row of the wire list 275 identifies pairwise connections between discrete program instructions 254 and the wire making the connection. Multiple rows serve to record circuit branches.

Thus, for example, the PB102 of FIG. 12, being connected directly to the left power rail L1 by wire 1021, provides a first row in the wire list 275 as wire number 1021, from L1, to PB 102:1. Likewise, where PB102 is next connected to CON 102, the next entry in the wire list will be wire number: 1022 from PB102:2, to CON 102:1 indicating that current may then pass from the second terminal of PB102 to the first terminal of the CON 102.

The wire list 275 thereby provides a distillation of control program 250 indicating wires and the terminals and discrete program instructions 254 to which they connect. The essential information of the wire list is produced as a file from commercially available software tools such as the PROMIS-E automatic documentation system manufactured by ECT, Inc. of Brookfield, Wis. which runs as an application inside the AutoCAD program manufactured by AutoDesk, Inc.

The wire list 275 together with the supplemental data list 267 (FIG. 10) fully defines the logical structure of the controller program through the interconnections of particular program instructions 254 with wires 258.

Figure 5:
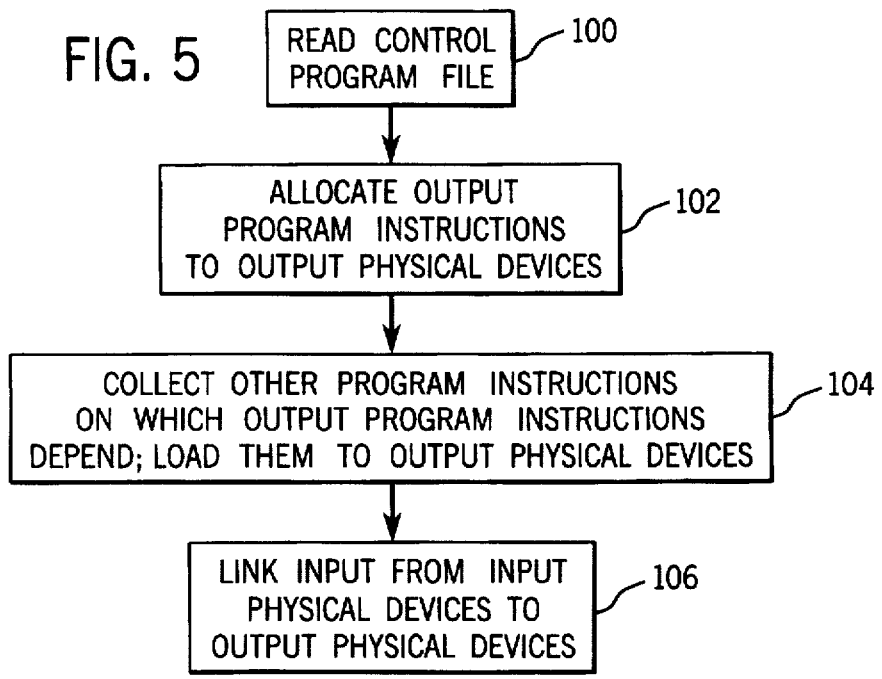
FIG. 5 is a flow chart of the steps of partitioning a centrally developed control program such as that of FIG. 4 for the process of FIG. 3.

Referring now to FIGS. 4 and 5, after the control program 250 is created, the partitioning program of the present invention reads in the control program 250 in the form of the wire list 275 and the data list 267 as indicated at process block 100.

Next, at process block 102, the output program instructions e.g. SOL 102 and LT 105, SOL 109 and LT112 are identified for the purpose of partitioning the program into various computing devices 12. As has been mentioned, the output program instructions are those program instructions having external output connections indicated by column 276 of data list 267.

The allocation of these output program instructions to various computing devices requires the programmer to select the computing devices which may be used for these program instructions. Because multiple output program instructions may be held in a single computing device, the actual allocation is subject to the programmer's selection of hardware. The programmer is free to group input and output program instructions in a single computing device if it will support the input and output connections. Input program elements must also at this time be identified to a computing device 12.

In the process depicted in FIG. 2a, the programmer may, for example, indicate that the solenoids SOL 102 and SOL 109 are to be grouped together and the lights LT 105 and LT 112 are to be placed in a single control pendant along with pushbuttons 102 and 109.

Figures 6, 8:
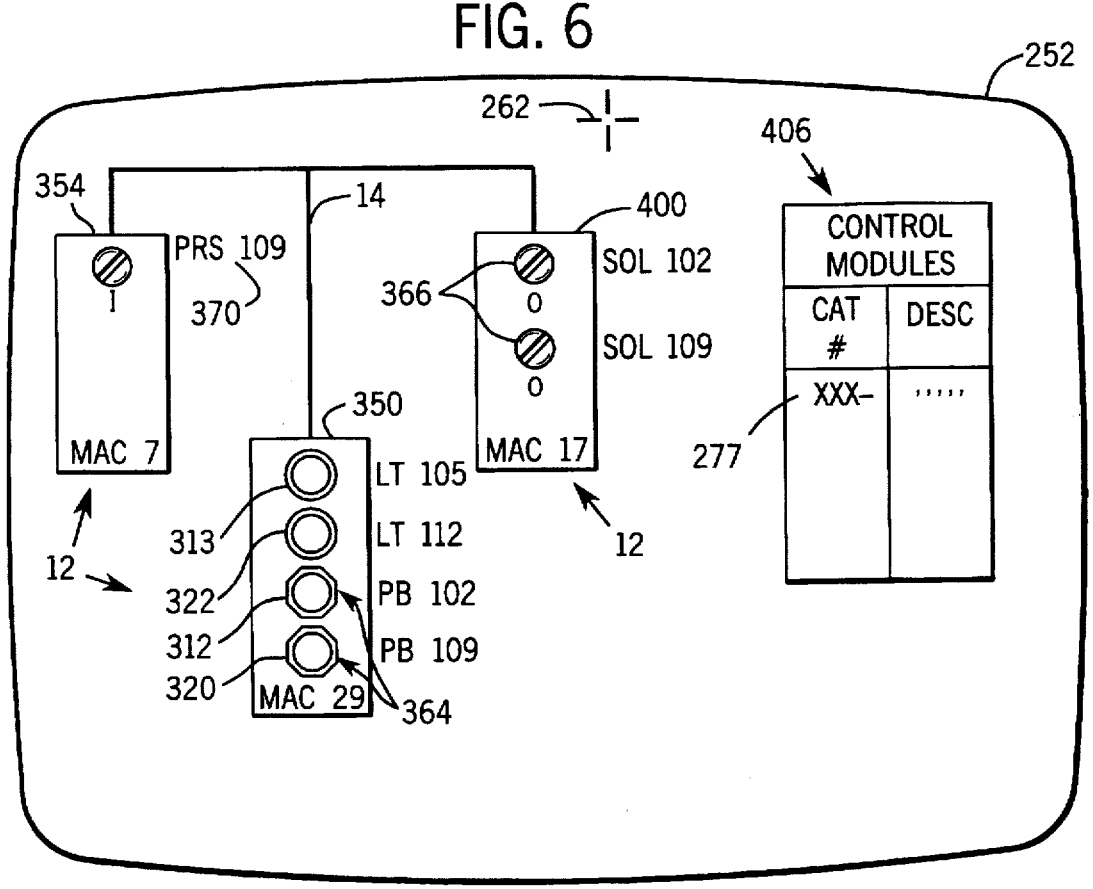
FIG. 6 is a physical view of the computing devices ultimately used to implement the control program of FIG. 4 in a highly distributed form according to the partitioning program of the present invention.
FIG. 8 is a catalog table used in the present invention to select the computing devices per FIG. 6.

As each group is proposed by the programmer, the proposed groupings are checked against a catalog file 400 shown in FIG. 8 of actual devices. The catalog file 400 lists in a first column 402, a single program instruction 254 such as a pushbutton limit switch or proximity switch identified by catalog numbers per computing device menu 266. In a second column 404, other spatially linked elements that may be implemented in a single computing device with the element of column 402 are listed. Thus, each row of the catalog file 400 describes a commercially available computing device that can be purchased to represent all the logical elements of that row.

Some computing devices, such as a solenoid, may have no particular product associated with them but may use a general purpose terminal block to which multiple devices may be wired. These additional devices are indicated by X's in column 404 and by a null character in the catalog file 400.

For each proposed grouping of the elements of the control program 250, the catalog file 400 is reviewed to see if a single computing device will support the grouping. If not, the programmer is so informed and a different grouping must be adopted. Each row of catalog file 400 also provides a catalog number for the computing device necessary to perform that grouping so that a parts list may be created for the programmer. Note that this catalog number 406 is for the computing device as distinct from the catalog number of computing device menu 266 of FIG. 4.

Each row of the catalog file 400 also includes two expected costs: the first indicating a relative purchase price 408 of the computing device selected so as to provide a costing estimate and to allow selection between two computing devices that are equally able to perform the desired grouping. The estimated installation cost 411 reflects the installation effort needed to incorporate the computing device into the system and is intended to guide the user to a computing device that requires less installation effort. Generally the purchase price cost in purchase price 408 increases with the number of functions supported by the computing device, whereas the installation cost 411 increases with the complexity of the installation. Thus a terminal block which may be used for many implementations has the greatest installation costs because it requires hand wiring of devices to it.

Ultimately when a grouping has been selected, these costs may be printed out to provide a cost estimate for the programmer. Spatially independent elements of the control program 9 are not listed in catalog file 400 as they have no associated computing devices.

Referring again to FIG. 5, the conclusion of process block 102, groupings of output program instructions will be established and computing devices will have been identified by catalog numbers from catalog file 400. Referring to FIG. 6, the groupings may be used to generate a physical view 252 of the distributed control system in this case employing three computing devices 12: a first computing device 354 providing an input for the proximity sensor PRS 109, a second computing device 350 providing output for the lights LT 105 and LT 112 and inputs for the pushbuttons PB 102 and PB 109 and the third computing device 440 providing outputs for the solenoids SOL 102 and SOL 109.

Referring to FIG. 11, after the computing devices 12 have been identified, a new file 360 is then created listing the computing device to be used and their catalog numbers and assigning each of them a unique address that will be used on a link connecting the computing devices to each other and that may serve as the group number for the next steps of the partitioning process. This data file 360 links each computing device (by its catalog number) to an assigned address (on the link) or group number to other data describing the computing device and obtained from a directory of computing devices identified by the catalog number 406 of catalog file 400.

Figure 7:
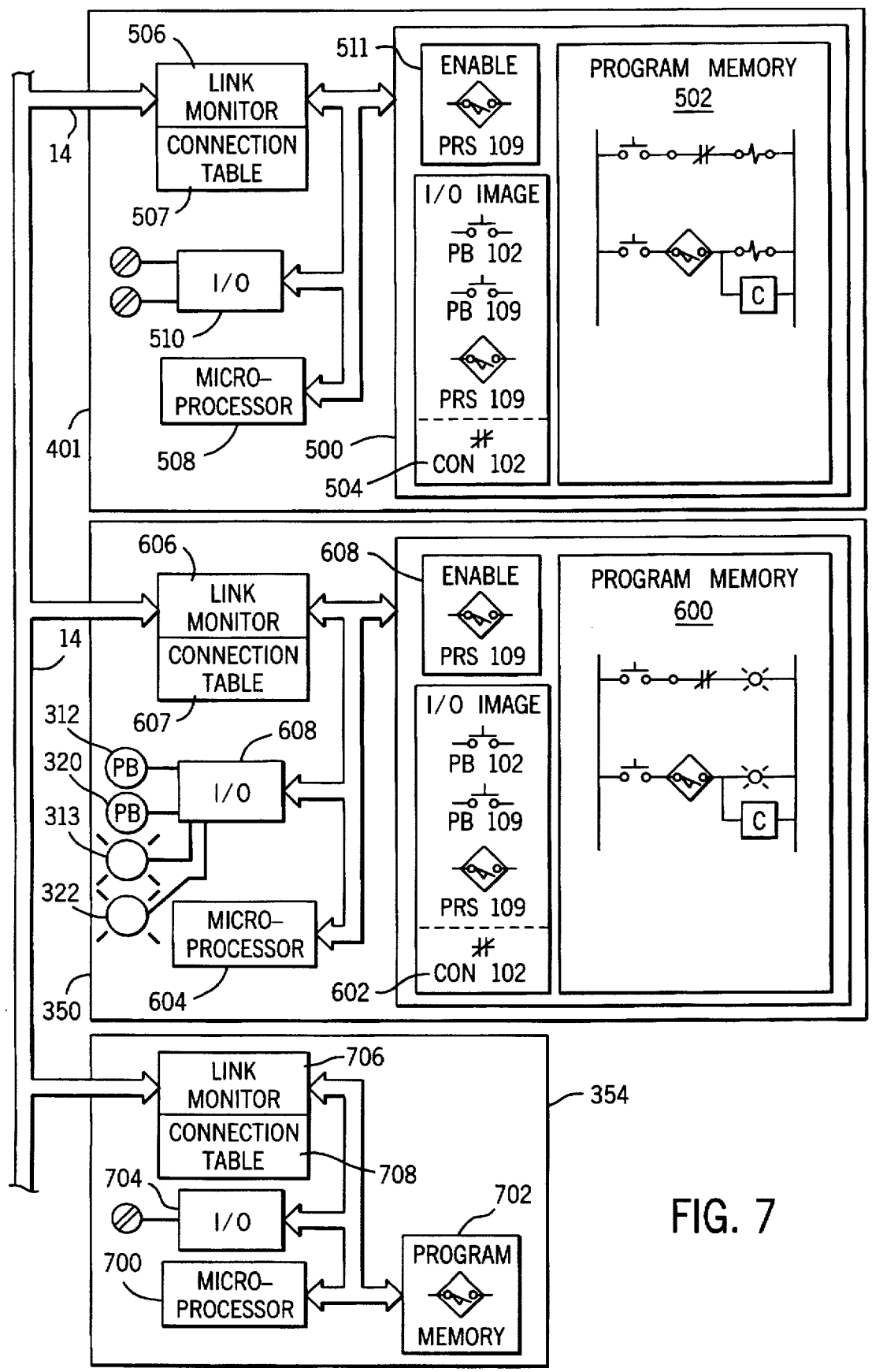
FIG. 7 is a schematic representation of three computing devices shown in FIG. 6 showing the contents of their program memories, their I/O table memories, and their enable memories.

Referring again to FIG. 5, next at process block 104, the remaining program instructions 254, other than output program instructions 254, are allocated to computing devices 12 that were selected to hold the output program instructions. Referring to FIGS. 4 and 7, computing device 401 which is used to provide the outputs to the solenoids SOL 102 and SOL 109 has loaded into its program memory 500 each of the program instructions 245 on which the outputs to solenoids 102 and 109 depend. Thus the program memory 500 includes in a first rung, the pushbutton PB 102 and the contact CON 102, the series combination of which drives the solenoid SOL 102. For solenoid SOL 109, the program memory holds a second rung having PB 109 and PRS 109.

An I/O table 504 is also provided in the memory 500 to hold a state of each input I/O element on which the outputs to the solenoids depend and so as to record the state of that element as it is reported to the computing device 401 from the computing devices supporting input devices. Thus the I/O table 504 includes memory locations for the state of PB 102, PB 109, and PRS 109, all of which represent physical inputs. The I/O memory also holds temporary variables established in the operation of the control program 9 in this case CON 102 which does not represent a physical input but simply the result of the output of counter CTR 111 which being spatially unlinked may also be placed in the program memory 502.

In operation, state information from the various physical inputs of PB 102, PB 109 and PRS 109 are received by the link 14 by link monitor 506 which may be a portion of a CAN controller. The link monitor 506 refers to a connection table that is provided by the partitioning program, as will be described, to determine which messages are intended for it and to properly address messages to other computing devices 12. One example of a CAN controller suitable for connected messaging is 80C592 microcontroller preprogrammed for executing the CAN protocols commercially available from Signatecs Corporation having offices in Sunnyvale, Calif. The CAN specification defines the requirements which comprise the Media Access Control (MAC) and physical signaling layers of the ISO/OSI for data communication links. The CAN protocols are specified in ISO document ISO/TC22/SC3/WG1 as authored by Robert Bosch GmbH, hereby incorporated by reference. A more complete description of the hardware of the computing devices 12 and the link 14 is found in U.S. Pat. No. 5,452,201 issued Sep. 19, 1995 assigned to the same assignee as the present invention and hereby incorporated by reference.

As the information on the physical inputs is received by the link monitor 506, it is placed in the I/O state table 504. A microprocessor 508 of the computing device 401 then reads the program stored in program memory 502 on a periodic basis, or after receiving inputs from the link, taking inputs from the I/O table 504 and computing the outputs of solenoid 102 and 109. These outputs are provided to the actual solenoids through an I/O circuit 510. The microprocessor 508 scans the program in the program memory 502 constantly so as to provide rapid updates of the solenoid states.

In this manner, for example, it will be understood that generally the states of the various physical inputs PB 102, PB 109 and PRS 109 will be received at different times and the last switch closure of PB 102, PB 109 and PRS 109 will cause an essentially instantaneous operation of the solenoid outputs.

Likewise computing device 350 is programmed to contain in its program memory 600 all of the program instructions necessary for the controlling of the lamps LT105 and LT112. As before, an I/O memory 602 is prepared and a microprocessor 604 reading data off the link 14 via link monitor 606 controls outputs to the various lamps via I/O 608. In this case, computing device 350 also receives inputs from the switches PB 102 and PB 109 writing those inputs into the I/O table 602 and outputting those inputs on the link according to information in the connection table 607.

Computing device 354 is programmed but not with the program elements 254 but only to transmit any change in state in the proximity switch PRS 109 on the link 14 to computing devices 350 and 401. For this purpose, computing device 354 is similar to computing devices 401 and 350, containing a microprocessor 700, memory 702, I/O 704 communicating in this case with the proximity switch PRS 109, and a link monitor 706 with an associated connection table 708 indicating a broadcast connection to computing devices 350 and 401.

Each computing device 401 and 350 also contains an enable table 511, and 608, respectively. These tables identify one or more program instructions 254 whose change of state causing a scanning of the program to be immediately initiated. Enable memories are used by the link monitors to interrupt the microprocessors directly causing it to immediately begin evaluation of the loaded program.

In the example of FIG. 4, the proximity switch PRS 109 might, for example, be placed in the enable memory 511 indicating that the rung having solenoid SOL 109 in it need not be evaluated until PRS 109 closes. Although in this simple example little is gained by this enablement, in more complex programs, an enable input may provide more rapid response by coordinating the evaluation of the program stored in the program memories at a time proximate to a time when the output must be available. Thus, for example, enable memory 511 may be used to store an input which indicates a time at which an output is desired to be evaluated by other portions of the program.

Referring again to FIG. 5 at process block 104, the partitioning program of the present invention collects all the other program instructions 254 on which the output program instructions depend into the program memory of the associated computing devices 12 for those output program elements.

As a last step at process block 106, the connection memories 708, 607, and 507 of the various computing devices are loaded to create connections that allow input data to be transmitted to the correct output computing device 12 for processing.

Note that the program memories 600 and 502 contain duplicate program instructions of the control program 9 which may be executed in parallel through the above partitioning system.

Once the grouping of FIG. 7 is determined, a physical view 252 is displayed on the computer display 255 and described by files stored in the computer: in particular files 358 and 368 as shown in FIG. 9. The computing device data file 358 links addresses on the communications link 14 (a MAC address) associated with a given computing device to the spatial screen coordinates of the outline representing that computing device. Similarly, the device data file 368 links the unique program instruction name 269 of the elemental functions to the screen coordinates of their physical symbols. This data together with an identification of the physical icon 364 used to represent the elemental function of the unique program instruction name 269 (provided by data list 267) is sufficient to reconstruct the physical diagram and thus incorporates its essential information.

The computing device data file 358 indicates the grouping selected in FIG. 7 by associating each program instruction 254 with the coordinates of its computing device. This information is combined by means of the common screen coordinate data to produce a linkage table 372 in which each row provides the name of the program instruction 254, its address on the link 14 (that is the address of its computing device) and an instance number being a subaddress within the address of the computing device used to identify that particular program instruction. Thus, for example, according to the physical view 252, pushbutton PB102 is in the computing device at address 29, and in instance 3, the third program instruction 254 in that computing device 12. Messages connected to address 29 instance 3 will be received by the software emulating pushbutton PB102.

Table 372 is generated by combining files 358 and 368 and is used to program the various computing devices 12 by sorting through the computing devices by addresses identifying those program instructions that will be emulated by that computing device and looking up the emulating code in data list 267 for downloading to that computing device 12. This downloading is indicated by process block 106 of FIG. 2b. In general, the emulating code is quite simple. For a pushbutton, the program simply reads messages indicating that it has "received" current from another function and transmits messages indicating "current" at its output if the pushbutton is closed, and otherwise indicates no current is present at its output.

Next the virtual wiring between the program instructions must be established per the control program 250, i.e., the connections between the computing devices by the common communication link 14. This virtual wiring requires that each element identify the address of the outputs of other elements to which it is connected and is produced by means of connection table 376 which provides a from and to address indicating a virtual connection between every output terminal of a program instruction 254 and every input terminal of a program instruction 254 to which it is connected. The connection table may be used to establish connected messaging well understood in the art and readily implemented with the CAN hardware described in the predecessor patent well known in the art and readily commercially available. Specifically, each program instruction 254 identified on the wire list 275 is linked to its address in instance from table 372 to create a composite address including the address of the computing device 12 followed by the instance of the program instruction 254 within the computing device 12 followed by a terminal number of the program instruction. The number of terminals of the device is provided in the data list 267 of FIG. 11 and is part of the information predetermined by the catalog number of the device.

Thus for example, input terminal of pushbutton PB102 has an address of 29/3:1 where 29 is the address of its computing device 12, 3 is the instance number in the computing device (it is the third program instruction 254 implemented by that computing device) and 1 is the number of its terminal (it has two terminals) which is the input as shown on the control program 250. Then for example, wire 1021 connecting device L1 (the supply rail) to the first terminal of pushbutton PB102 shows a row on the connection table where the address from L1 (a standard designation since L1 will always be in every control program 250) and a second column of that row for address 2 being 29/3:1.

Implementing the virtual connection between computing devices 12 may be performed by finding each computing device with an address to entry and loading that row of the connection table to that computing device to create a connection chart for that computing device allowing it to open connections between that computing device and other computing devices reflecting that wire. At the same time, the necessary code fragments being portions of the control program 250 are loaded to the computing device 12.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made:

I claim:

1. A partitioning program for dividing a control program, used to control industrial equipment, into portions to be executed by spatially separated computing devices;

where the computing devices have a program memory and communicate with other computing devices via messages on a communications link and are attached to parts of the industrial equipment directly, not through the communications link, to provide output signals and to receive input signals;

where the control program, when executed, accepts the input signals from the industrial equipment and determines the output signals to the industrial equipment and input instructions testing input signals to the industrial equipment;

where the control program is composed of logically interconnected program instructions including output instructions representing output signals to the industrial equipment;

the partitioning program executing on an electronic computer and comprising:

(a) an allocation routine reviewing the control program to identify output instructions and copying a given output instructions from the control program to the program memory of a particular computing device that is directly attached to the part of the industrial equipment receiving the output signal of the given output instruction; and (b) a collection routine identifying other program instructions including input instructions on which the output signal represented by the given output instruction depends, and based on that identification, copying into the program memory of the particular computing device, the other program instructions on which the output signal represented by the given output instructions depends.

2. The partitioning program recited in claim 1 including in addition:

(c) a linking routine copying to computing devices receiving input signals needed by the other program instructions, a connection record indicating a path of communication on the communication link to the particular computing device holding the given output instruction.

3. The partitioning program recited in claim 1 including in addition:

(c) a linking routine copying to the particular computing device addresses on the communication link of other computing devices receiving input signals needed by the other program instructions.

4. The partitioning program recited in claim 1 wherein the control program is written using relay ladder instructions and the output instructions are coil instructions.

5. The partitioning program recited in claim 1 wherein the control program is written using relay ladder instructions and the other instructions include contact instructions.

6. A highly distributed industrial control system executing a control program composed of logically interconnected program instructions including output instructions representing output signals to industrial equipment, the highly distributed industrial control system comprising:

(1) a communication link;

(2) a plurality of computing devices having program memories and programmed to communicate with other computing devices via messages on a communications link;

(a) the computing devices including at least a first and second output computing device directly attached to a first and second part of the industrial equipment, not through the communications link, to provide output signals to the parts of the industrial equipment;

(i) the program memory of the first output computing device holding:

(A) at least one first output instruction from the control program representing a first output signal to the first part of the industrial equipment directly attached to the first output computing device;

(B) other program instructions on which the first output signal represented by the first output instruction depends;

(ii) the program memory of the second output computing device holding:

(A) at least one second output instruction from the control program representing a second output signal to the second part of the industrial equipment directly attached to the second output computing device;

(B) other program instructions on which the second output signal represented by the second output instruction including redundant program instructions also held in the program memory of the first output computing device;

(b) the computing devices also depends including input computing devices directly attached to parts of the industrial equipment not through the communications link to receive input signals, the input computing device programmed to relay input signals from the parts of the industrial equipment to the output computing devices having program instructions requiring the input signals.

7. The highly distributed industrial control system recited in claim 6 wherein the input computing devices are programmed to broadcast input signals to all computing devices on the link.

8. The highly distributed industrial control system recited in claim 6 wherein the output computing devices are programmed to poll the input computing devices for other instructions on which the output instruction of the output computing device depends, and wherein the input computing devices are programmed to respond to polling messages of the output computing devices in relaying the input signals.

9. The partitioning program recited in claim 6 wherein the control program is written using relay ladder instructions and the output instructions are coil instructions.

10. The partitioning program recited in claim 6 wherein the control program is written using relay ladder instructions and the other instructions include contact instructions.

* * * * *